United States Patent [19]

Kerdoncuff et al.

[11] Patent Number: 5,558,301
[45] Date of Patent: Sep. 24, 1996

[54] AIRCRAFT AND IN PARTICULAR ROTARY-WING AIRCRAFT SEAT HAVING AN ENERGY ABSORPTION DEVICE AUTOMATICALLY ADJUSTABLE AS A FUNCTION OF THE SIZE OF THE OCCUPANT

[75] Inventors: Ronan Kerdoncuff, Nieul/Mer; Gabriel Martin, Echillais, both of France

[73] Assignee: Aerospatiale Societe Nationale Industrielle, France

[21] Appl. No.: 360,564

[22] Filed: Dec. 21, 1994

[30] Foreign Application Priority Data

Dec. 22, 1993 [FR] France .................................. 93 15467

[51] Int. Cl.⁶ .................................................. B64D 11/06
[52] U.S. Cl. ................................. 244/122 R; 244/118.6; 248/575; 248/421; 297/216.17
[58] Field of Search ............................. 244/122 R, 118.6; 297/216.13, 216.17; 248/575, 589, 581, 421

[56] References Cited

U.S. PATENT DOCUMENTS

| | | | |
|---|---|---|---|
| 3,908,953 | 9/1975 | Miller | 248/421 |
| 3,985,388 | 10/1976 | Hogan | 244/122 R |
| 4,525,010 | 6/1985 | Trickey et al. | 297/216.17 |
| 4,702,353 | 10/1987 | Yang | 297/216.17 |
| 5,273,240 | 12/1993 | Sharon | 244/122 R |

FOREIGN PATENT DOCUMENTS 1197117  11/1959  France .

*Primary Examiner*—Andres Kashnikow
*Assistant Examiner*—Tien Dinh
*Attorney, Agent, or Firm*—Dvorak & Traub

[57] ABSTRACT

In order that the acceleration suffered by the occupant (O) of an aircraft, particularly a rotary-wing aircraft seat in the case of an accident remains below a humanly withstandable limit, no matter what the size of said occupant, a seat is proposed in which a height regulation of the pan or bucket (16), in which the occupant is received, also has the effect of modifying the inclination of the energy absorbers (38). Thus, the vertical component of the retaining force exerted on the pan (16) by said absorbers decreases with the size of the occupant, which leads to the desired result.

9 Claims, 4 Drawing Sheets

AIRCRAFT AND IN PARTICULAR ROTARY-WING AIRCRAFT SEAT HAVING AN ENERGY ABSORPTION DEVICE AUTOMATICALLY ADJUSTABLE AS A FUNCTION OF THE SIZE OF THE OCCUPANT

DESCRIPTION

The invention relates to an aircraft, particularly a rotary-wing aircraft seat equipped with energy absorption means, whose vertical component is automatically adjusted during the height regulation of the seat.

Figure 1:
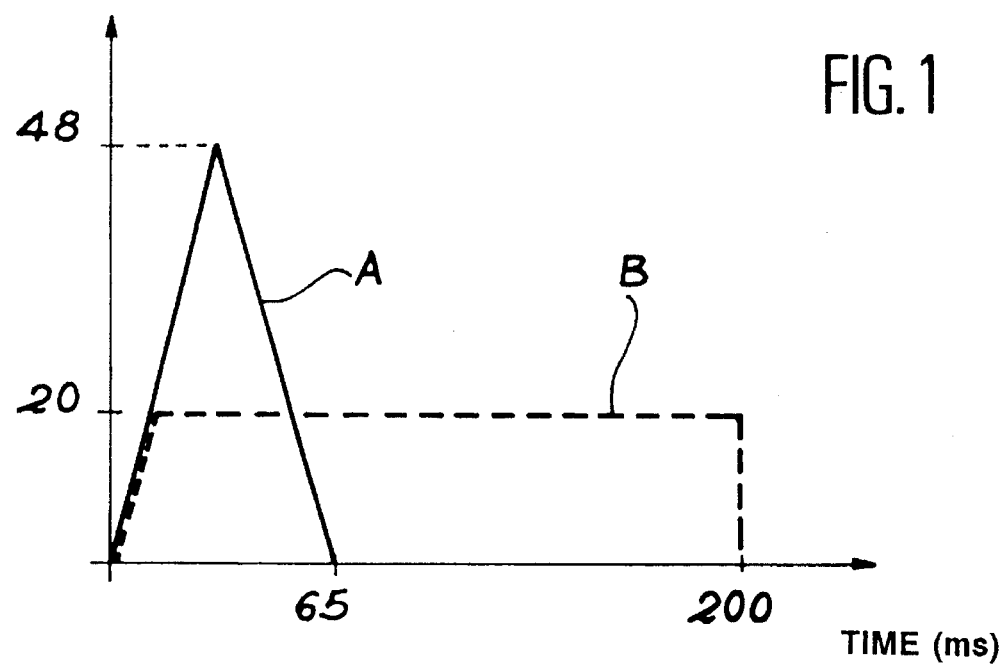

In the case of a helicopter accident, the seats such as that of the pilot are subject to a downward acceleration peak, whose most probable profile is that of a triangular peak corresponding to a maximum acceleration of 48 g and a duration of 65 ms, as shown in continuous line form (curve A) in FIG. 1.

FIG. 1 also shows in discontinuous line form (curve B) the maximum, downward acceleration profile which can be withstood by a human without suffering serious injury. This profile corresponds to an acceleration of approximately 20 g for approximately 200 ms.

A comparison between the continuous line curve A and the broken line curve B in FIG. 1 reveals that the protection of the occupant of a helicopter seat in the case of an accident can only be obtained by allowing a controlled vertical displacement of the pan or bucket of the seat in which the occupant is received, with respect to the frame used for fixing the seat to the floor. This displacement is controlled by energy absorption means, which withstand part of the shock, so that the vertical acceleration actually suffered by the occupant remains within acceptable limits.

Moreover, in the case of a pilot seat, means for regulating the height of the pan relative to the frame are also provided, so that the eyes of the pilot are always at an appropriate height, no matter what his size.

In practice and as illustrated by U.S. Pat. No. 3,985,388, the energy absorption means and the height regulating means are generally incorporated into a connecting structure between the pan and the seat frame. More specifically, the means for regulating the height of the seat pan act on said pan through energy absorption means, so that the characteristics of the energy absorption means remain unchanged when the pan height is regulated.

Moreover, the series arrangement of the pan height regulating means and energy absorption means in the connecting structure connecting the pan to the frame makes it necessary to limit the vertical displacement of the energy absorption means to the minimum distance separating the pan from the floor when said pan occupies its bottom position. Thus, the energy absorption means are normally dimensioned so that in the case of an accident, the vertical acceleration transmitted to a heavy occupant is completely absorbed on the thus limited vertical displacement.

However, this conventional arrangement is highly prejudicial with regards to acceleration to a light component. Thus, when using conventional energy absorption means and with a constant force or stress, a heavy occupant withstands a relatively small acceleration and gives rise to a considerable displacement, whereas a light occupant is exposed to a severe acceleration and only brings about a small displacement.

To obviate these disadvantages and as illustrated by U.S. Pat. No. 4,408,738, the conventional energy absorption means, with constant force, are replaced by regulatable force energy absorption means. The regulation of the force takes place by an electromechanical device sensitive to the corpulence of the occupant, the latter being determined by the elongation of a regulatable belt fixed around his torso.

Although the arrangement described in U.S. Pat. No. 4,408,738, in principle makes it possible to apply to any occupant a substantially uniform vertical acceleration, no matter what his corpulence, it is still a complex and costly device. Thus, this device requires the presence of sensors on the seat belt, the use of a complex electromechanical device and the use of variable force energy absorption means.

The invention specifically relates to an aircraft seat, whose original design makes it possible to modify, as a function of the size of the occupant, the retaining force exerted on the latter by the energy absorption means in the case of an accident, so that the occupant is exposed to a substantially uniform vertical acceleration no matter what his size, by means of a particularly simple mechanism using neither a sensor, nor variable force energy absorption means.

According to the invention, this result is obtained by means of an aircraft seat comprising a pan or bucket able to receive an occupant, a frame fixed to the aircraft floor and a connecting structure between the pan and the frame, incorporating pan height regulating means and energy absorption means, exerting a retaining force on the pan, characterized in that the regulating means act on the energy absorption means in order to modify the inclination thereof, in such a way that the vertical component of the retaining force varies in the reverse sense to the distance separating the pan from the floor, during an actuation of the regulating means.

Due to the fact that the seat pan height regulating means also have the effect of modifying the inclination of the energy absorption means, the vertical component of the retaining force applied to the occupant in the case of an accident is greater for a small occupant than for a large occupant. However, statistical studies carried out on pilots have revealed that their weight varies in the same sense as their size. Thus, the seat according to the invention makes it possible, in the case of all accident, to subject the occupants to an acceleration remaining within the humanly acceptable limits, no matter what their weight.

In a preferred embodiment of the invention, the energy absorption means exert a constant retaining force on the pan, without requiring any adjustment other than that of the height of the pan.

In this same embodiment of the invention, the energy absorption means comprise at least one pair of energy absorbers arranged substantially symmetrically with respect to a median vertical plane of the seat, the first ends of the absorbers of each pair being separated by a constant distance, whereas the other ends of said absorbers are separated by a distance varying during an actuation of the regulating means.

In this case, the frame advantageously has two parallel, lateral guides on which the pan is mounted in sliding manner, the first ends of the absorbers of each pair being articulated to said guides, whilst the other ends of said absorbers are connected to a back of the pan by two articulated levers belonging to the regulating means, said levers being symmetrical with respect to the median vertical plane of the seat.

Preferably, each of the levers is articulated to the other ends of the absorbers of each pair and to a fitting fixed to the back.

Advantageously, the pan height regulating means comprise means for locking the pan in a given position.

The levers can then be articulated to a first end of the absorbers, to a central portion of the fitting and to a variable length link incorporating the locking means at the second end thereof.

Preferably, the seat also has means for the automatic raising of the pan bringing the latter into a top position. These automatic pan raising means are advantageously interposed between the levers.

The invention is described in greater detail hereinafter relative to a non-limitative embodiment and with reference to the attached drawings, wherein show:

FIG. 1, already described, respectively, as a function of time (in ms), the vertical acceleration peak A to which is exposed a helicopter in the case of an accident (in continuous line form) and the maximum vertical acceleration B which can be withstood by a human (in discontinuous line form).

Figure 2:
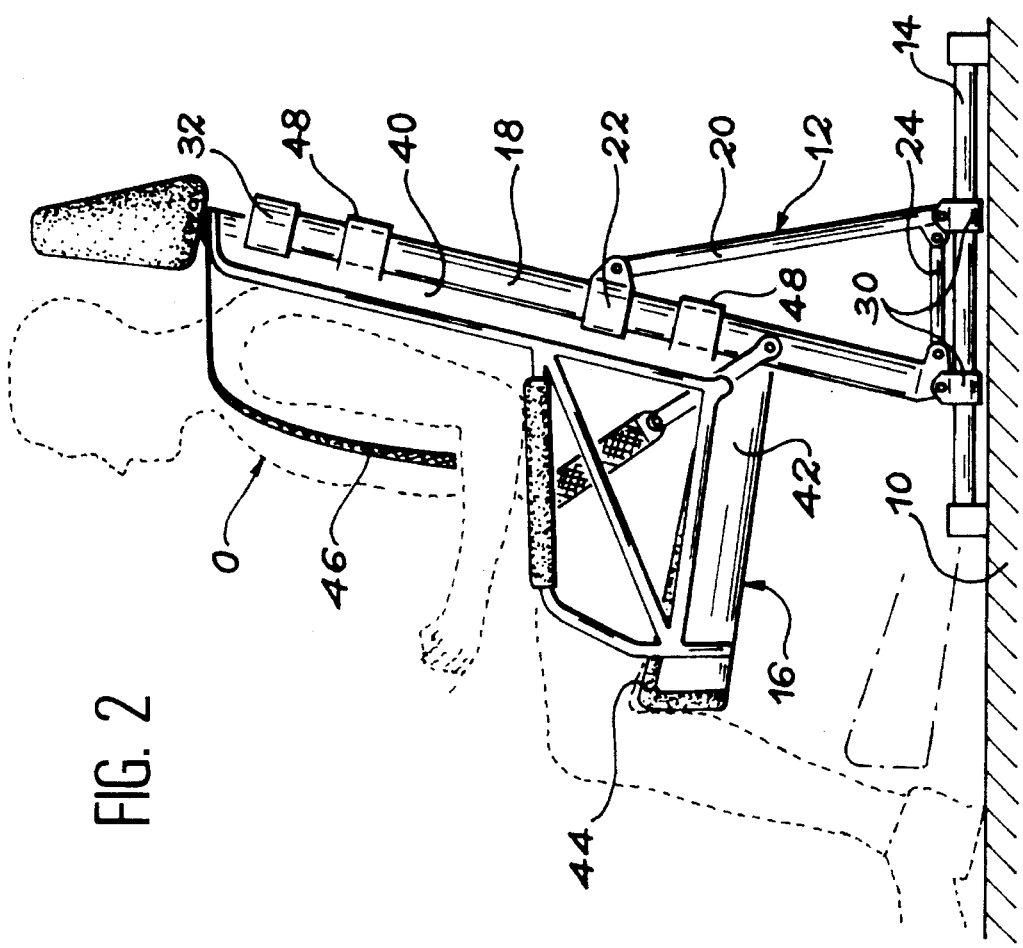

FIG. 2 a side view of an aircraft seat according to the invention.

Figure 3:
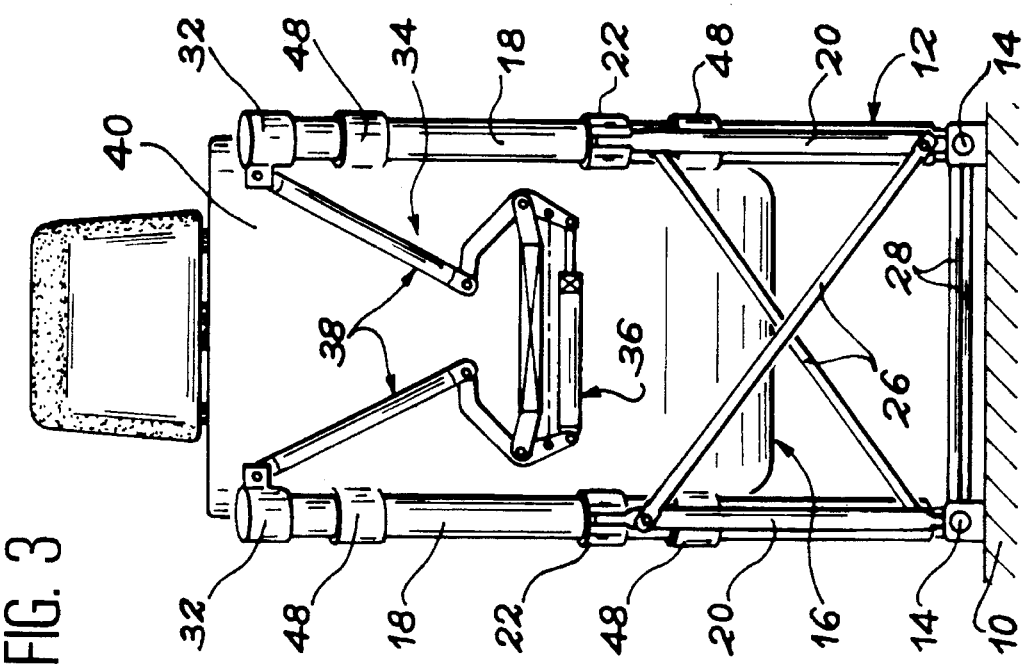

FIG. 3 a rear view of the aircraft seat of FIG. 2.

Figure 4:
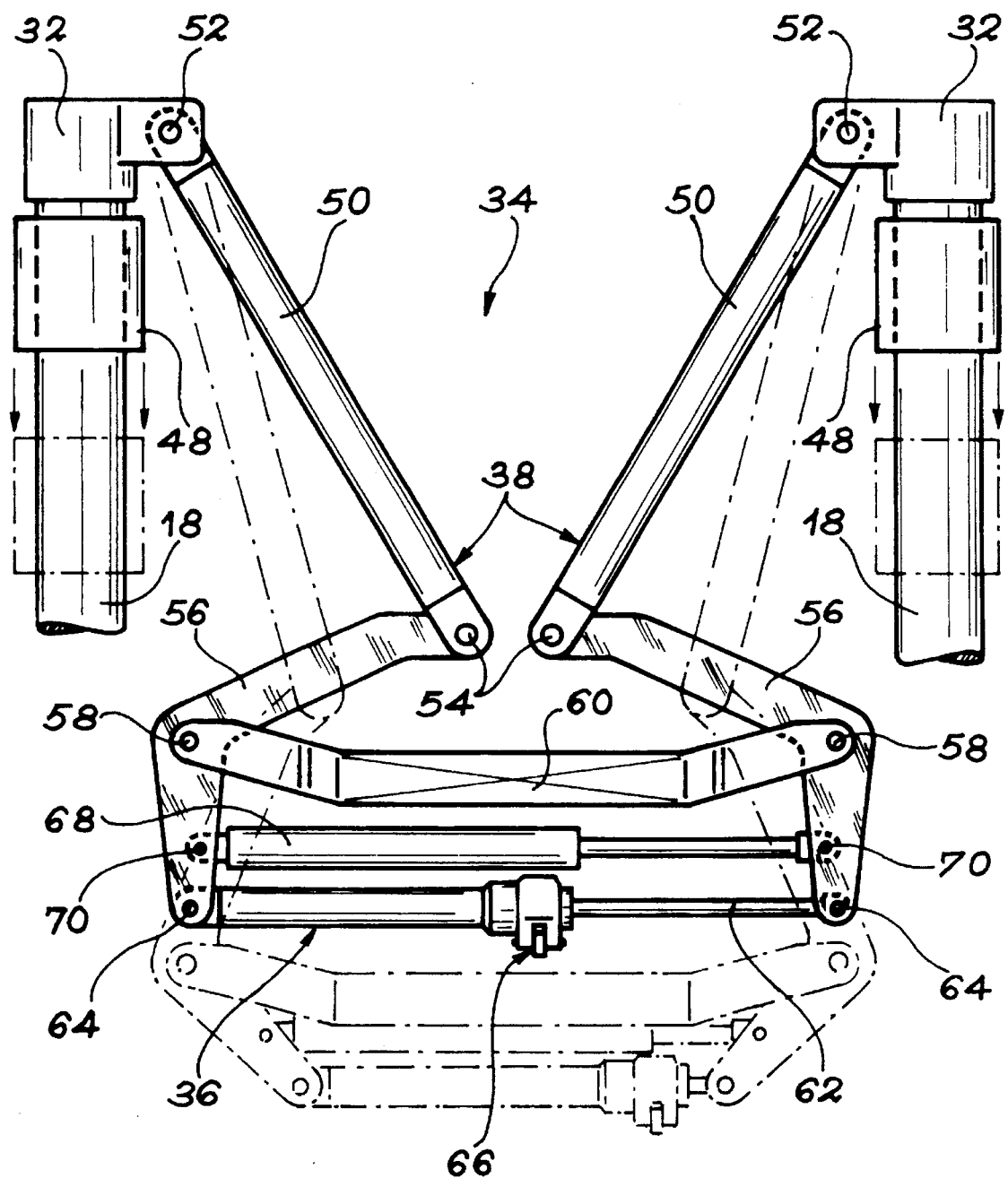

FIG. 4 a view comparable to FIG. 3 showing on a larger scale the connecting structure between the pan and the frame of the seat in the position occupied by said structure when the seat pan is in the top position (in continuous line form) and in the bottom position (in broken line form).

Figure 5:
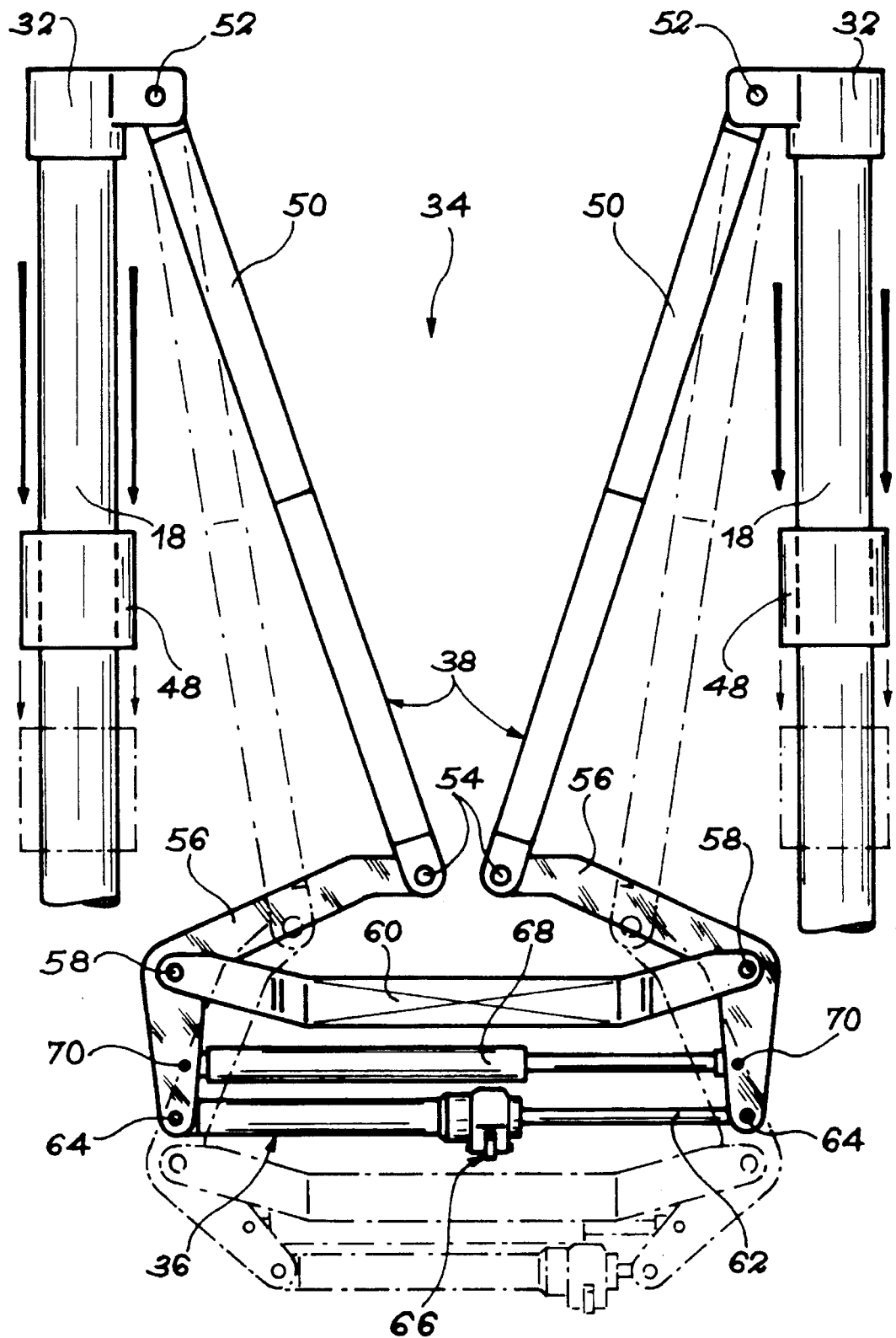

FIG. 5 a view comparable to FIG. 4 showing, after an accident, the state of the connecting structure in the case where the seat pan initially occupied a top position (in continuous line form) and in the case where said same pan occupied at the outset a bottom position (in broken line form).

Figure 6:
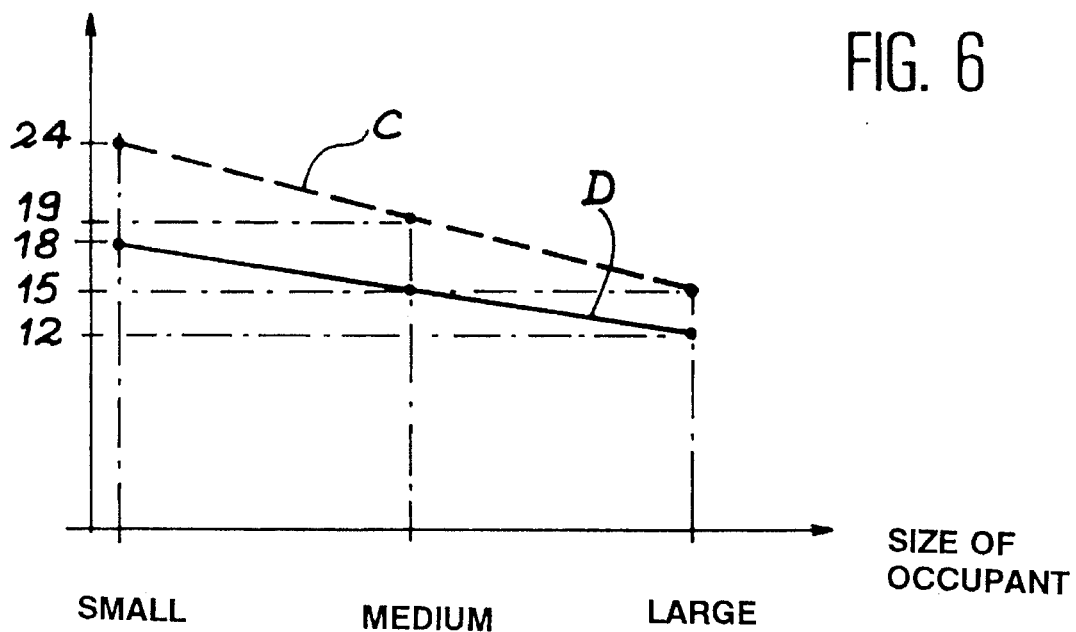

FIG. 6, as a function of the size of the occupant, the acceleration in g suffered in the case of an accident, in the case of a conventionally designed seats (in broken line form) and in the case of the seat according to the invention (in continuous line form).

FIGS. 2 and 3 show a pilot seat for equipping an aircraft, such as a rotary-wing aircraft, according to the invention. In these drawings, the reference 10 designates the aircraft floor. To the floor is fixed a seat frame, designated in general terms by the reference 12, whereof an embodiment will now be described.

The frame 12 is rigid and mainly formed from aluminium rods and tubes assembled with one another by machined parts. It is mounted on two tubes 14 fixed to the floor 10 by their ends, so as to be lockable on said tubes 14. The tubes 14 are arranged parallel to the longitudinal axis of the aircraft. Thus, this arrangement makes it possible to regulate the position of the seat along said axis.

The frame 12 supports a pan or bucket 16 constituting the element of the seat in which is received the occupant. To this end, the frame 12 has two tubes 18 forming lateral guides ensuring the vertical guidance of the pan 16. These tubes 18 are arranged parallel to one another above the horizontal guidance tubes 14 from which thy extend substantially vertically upwards and slightly rearwards. To the rear of each of the vertical guidances tubes 18, the frame 12 has a strut 20 constituted by an aluminium rod. A connecting part 22 is used for fixing the upper part of each of the struts 20 to the central portion of the corresponding vertical guidance tube 18.

In order to rigidify the frame 12, the lower end of each vertical guidance tube 18 is connected to the lower end of the strut 20 placed behind said tube by a horizontal tie 24 placed above the corresponding horizontal guidance tube 14.

In order to prevent twisting and lateral tilting of the seat, the frame 12 also has two sets of two X rods. A first set of X rods 26 connects the upper end of each strut 20 to the lower end of the other strut. A second set of X rods 28 connects the front end of each tie 24 to the rear end of the other tie.

Finally, four guidance parts 30, mounted at the lower ends of the vertical guidance tubes 18 and the struts 20, ensure the fitting of the frame 12 to the horizontal guidance tubes 14. These guidance parts incorporate bearings having a low friction coefficient ensuring the sliding of the frame along the tubes 14, as well as locking means enabling the frame to be locked in the desired position.

The upper end of each of the vertical guidance tubes 18 carries a fitting 32 for the attachment of a connecting structure 34 by which the pan 16 is fixed to the frame 12. This connecting structure 34, which will be described in greater detail hereinafter, in known manner incorporates means 36 for regulating the height of the pan 16 and energy absorption means 38.

The seat pan 16 illustrated in FIGS. 2 and 3 has a back 40 integral with a seat member 42 supporting a cushion 44 on which is seated the occupant 0. The latter is secured on the pan 16 by a harness 46 having a ventral belt, two shoulder straps and a strand between the legs.

In order to ensure the installation of the pan 16 on the frame 12, whilst still permitting a vertical displacement of the pan, in order to permit its height regulation and energy absorption in the case of an accident, the back 40 of the pan 16 has on its rear face two pairs of bearings 48. Each of these pairs of bearings 48 is mounted in sliding manner on one of the vertical guidance tubes 18.

The connecting structure 34 by which the pan 16 is fixed to the frame 12 will now be described in detail relative to FIGS. 4 and 5. As illustrated in these drawings, the connecting structure 34 is symmetrical relative to a vertical median plane of the seat. It is placed behind the back 40, between the vertical guidance tubes 18.

In the illustrated embodiment, the connecting structure 34 incorporates two energy absorbers 50, arranged symmetrically with respect to the median vertical plane of the seat and forming the energy absorption means 38. The energy absorbers 50 are identical and exert a constant retaining force on the seat pan 16. They can be of a random type without passing outside the scope of the invention. They generally consist of mechanisms subject to a permanent deformation during an accident causing their elongation.

The upper end of each of the energy absorbers 50 is articulated by a pin 52 to one of the fittings 32 installed at the upper end of the corresponding vertical guidance tube 18. More specifically, the pivot pins 52 are oriented perpendicular to a plane passing through the axes of the tubes 18 and the energy absorbers 50. The spacing between the top ends of the energy absorbers 50 is consequently constant and determined by the distance separating the pivot pins 52.

At their lower end, each of the energy absorbers 50 is articulated by a pin 54 to the upper end of a V-shaped lever 56. The pivot pins 54 are oriented parallel to the pivot pins 52 and the levers 56 are located in a plane parallel to the plane containing the axes of the vertical guidance tubes 18 and the energy absorbers 50.

In their central portion corresponding to the tip of the V, the levers 56 are articulated by a pivot pin 58 to a common fitting 60 fixed behind the back 40 of the pan 16. The pivot pins 58 are parallel to the pivot pins 52, 54. The levers are arranged symmetrically with respect to the median vertical plane of the seat and the tip of the V's formed by said levers is turned towards the outside.

The lower ends of the levers 56 are connected by a link 62. More specifically, the ends of the link 69 are articulated to the levers 56 by pivot pills 64 parallel to the pivot pins 52, 54 and 58. The link 62 is of regulatable and variable length. It incorporates a bolt 66, whose locking makes it possible to maintain at a given value the length of the link.

Thus, the link 62 forms the means 36 for regulating the height of the seat pan 16. Thus, on increasing the length of said link 62 towards its maximum value, as illustrated in continuous line form in FIG. 4, the levers 56 pivot about their pivot pins 58 in the direction corresponding to the spacing of their lower ends articulated to the link 62. Bearing in mind the V shape of the levers 56, this pivoting leads to a reduction in the vertical distance separating the upper ends of the levers 56 from the fitting 60, as well as a moving together of said ends.

As the length of the energy absorbers 50 remains constant under normal flight conditions and the upper ends of said energy absorbers are articulated to the frame fittings 32, an elongation of the link 62 consequently leads to a rise of the fitting 60 and the pan 16 to which said fitting is fixed. The maximum elongation state of the link 62 illustrated in continuous line form in FIG. 4 consequently corresponds to the occupation of the seat by a small person.

Conversely, when the link 62 is shortened towards its minimum value, illustrated in broken line form in FIG. 4, the moving together of the lower ends of the levers 56 pivots said levers about their pivot pins 58, so that their upper ends tend to move away from the fitting 60 and from one another. Thus, the vertical distance separating the fittings 32 and 60 is increased, which leads to a lowering of the pan 16 and corresponds to the occupation of the seat by a large person.

In the connecting structure 34 according to the invention, the energy absorbers 50 therefore behave like articulated links, whose inclination varies as a function of the length given to the link 62. More specifically, FIG. 4 shows that the inclination of the energy absorbers 50 is at a maximum when the pan 16 occupies its top position illustrated in continuous line form and that it is at a minimum when the pan occupies its bottom position illustrated in broken line form.

The vertical component of the retaining force exerted by the energy absorbers on the pan 16 then increases as the position occupied by the pan 16 is lowered. In other words, the vertical component of the retaining force varies in the reverse sense to the distance separating the pan 16 from the floor 10, when the pan height regulating means 36 are actuated.

FIG. 5 illustrates the connecting structure 34 of FIG. 4 after an accident, in the case where the pan 16 was initially in the upper position (in continuous line form) and in the case where the pan was initially in the lower position (in broken line form).

No matter what the initial position of the pan 16, the lower part of the connecting structure 34 constituted by the levers 56, the fitting 60 and the link 62 undergoes no deformation during a crash, because the length of the link 62 remains locked at the value initially set by the occupant with the aid of the bolt 66. However, the vertical, downward acceleration undergone by the seat when the aircraft strikes the ground leads to an elongation of the energy absorbers 50, which absorb part of the shock.

Under the effect of this elongation and as is shown by the comparison of FIGS. 4 and 5, the inclination of the energy absorbers 50 tends to decrease during their elongation. Consequently, no matter what the initial height regulation of the seat pan 16, the vertical component of the retaining force applied to said pan by the energy absorbers 50 increases during the accident. The acceleration withstood by the occupant, which is directly proportional to said force, consequently increases slightly, but regularly, during the accident.

This characteristic is favourable in the case of a poor use of the seat, i.e. when the pan is set in the upper position for a heavy occupant or in the lower position for a light occupant. Thus, the available travels and maximum accelerations withstood by the occupants remain compatible in both cases with the occupant survival requirements.

As is also illustrated by FIGS. 4 and 5, the connecting structure 34 also incorporates means for the automatic raising of the pan 16, constituted by a device 68 positioned horizontally between the fitting 60 and the link 62 and whose ends are articulated by pins 70 to the levers 56. The pins 70 are parallel to the pivot pins 52, 54, 58 and 64. The device 68 can be constituted by any spring device (gas, metal, etc.) permanently exerting on the levers 56 a force tending to move apart the pins 70.

When the bolt 66 is released, the device 68 has the effect of pivoting the levers 56 about their pivot pins 58 in order to automatically bring the seat pan 16 into the upper position illustrated in continuous line form in FIG. 4. In order to regulate the height of the pan 16, the occupant consequently only has to lower it to the desired level, against said device 68, and then lock the link 62 with the aid of the bolt 66 in order to maintain the thus made setting.

Obviously, the invention is not limited to the embodiment described hereinbefore relative to FIGS. 2 to 5. Thus, it is clear that the energy absorption means 38 can incorporate several pairs of energy absorbers identical to the absorbers 50. In the same way, the mechanism making it possible to regulate the height of the pan 16 can differ from that described without passing outside the scope of the invention. Finally, the inclination change of the absorbers, during an actuation of the pan height regulating means, can take place in two random, separate planes.

FIG. 6 represents the acceleration in g undergone by the occupant of a conventionally designed helicopter seat, like that described in U.S. Pat. No. 3,985,388 (broken line curve C) and by the occupant of a seat according to the invention (continuous line curve D), as a function of the occupant size.

As indicated hereinbefore, in the case of an accident, the conventionally designed seat (curve C) makes the small occupants suffer high accelerations (up to 25 g), which exceeds the threshold which can normally be withstood by a human being without suffering a serious injury (cf. curve B in FIG. 1).

However, the seat according to the invention (curve D) ensures that, in the case of an accident, an acceleration exceeding the humanly admissible threshold is never applied to an occupant, no matter what his size.

It should be noted that the size and therefore weight range covered by the seat according to the invention can be shifted by changing the energy absorbers 50, e.g. if it is wished to add a shielding to the pain 16. Moreover, the size and therefore weight range can be widened by modifying the respective dimensions of the different parts forming the connecting structure 34 between the pan 16 and the frame.

The two modifications referred to hereinbefore also have the effect of modifying the acceleration peak which can be absorbed by the seat.

We claim:

1. Aircraft seat, comprising a pan for receiving an occupant, a frame fixable to an aircraft floor, and a connecting structure between the pan and the frame, said connecting structure comprising pan height regulating means and energy absorption means, wherein the energy absorption means has a variable inclination and exerts on the pan a retaining force having a vertical component which varies with said inclination, and wherein an actuation of the pan height regulating means results in a modification of the inclination of the energy absorption means, whereby the vertical component of the retaining force varies inversely with respect to the pan height.

2. Aircraft seat according to claim 1, wherein the energy absorption means exert a constant retaining force on the pan.

3. Aircraft seat according to claim 1, wherein the energy absorption means comprise at least one pair of energy absorbers arranged substantially symmetrically with respect to a median vertical plane Of the seat, first ends of each pair being separated by a constant distance, whereas the other ends of said absorbers are separated by a distance varying during an actuation of the regulating means.

4. Aircraft seat according to claim 3, wherein the frame has two parallel, lateral guides on which the pan is mounted in sliding manner, the first ends of the absorbers of each pair being articulated to said guides, whereas the other ends of said absorbers are connected to a back of the pan by two articulated levers connected to the regulating means, said levers being symmetrical relative to said median vertical plane.

5. Aircraft seat according to claim 4, wherein levers are articulated to the other ends of the absorbers of each pair and to a fitting fixed to the back.

6. Aircraft seat according to claim 5, wherein the regulating means comprise means for locking the pan in a given position.

7. Aircraft seat according to claim 6, wherein the levers are articulated to a first end of the absorbers, to a central portion of the fitting and to a variable length link, incorporating the locking means, at their second end.

8. Aircraft seat according to claim 5, wherein means for automatically raising the pan are provided.

9. Aircraft seat according to claim 8, wherein the automatic pan raising means are interposed between the levers.

* * * * *